United States Patent
Place et al.

(10) Patent No.: US 9,157,664 B2
(45) Date of Patent: Oct. 13, 2015

(54) SUPPORT STRUCTURE AND SYSTEMS INCLUDING THE SAME

(75) Inventors: Timothy Place, Marissa, IL (US); Dallas Kellerman, Belleville, IL (US); Phillip Torre, Lebanon, IL (US)

(73) Assignee: Cablofil, inc., Mascoutah, IL (US)

( * ) Notice: Subject to any disclaimer, the term of this patent is extended or adjusted under 35 U.S.C. 154(b) by 0 days.

(21) Appl. No.: 13/270,135

(22) Filed: Oct. 10, 2011

(65) Prior Publication Data

US 2012/0085041 A1 Apr. 12, 2012

Related U.S. Application Data

(60) Provisional application No. 61/391,463, filed on Oct. 8, 2010.

(51) Int. Cl.
*F24J 2/52* (2006.01)
*H02S 20/24* (2014.01)

(52) U.S. Cl.
CPC .............. *F24J 2/523* (2013.01); *F24J 2/5264* (2013.01); *H02S 20/24* (2014.12); *F24J 2/5233* (2013.01); *Y02B 10/20* (2013.01); *Y02E 10/47* (2013.01)

(58) Field of Classification Search
CPC ......... F24J 2/523; F24J 2/5233; F24J 2/5264; H02S 20/24; Y02B 10/12; Y02B 10/20; Y02B 10/47
USPC .......... 52/173.1, 173.3, 653.1, 652.1, 745.21; 248/175, 249, 346.01, 302, 237; 211/181.1, 195, 117, 119, 85.31, 90.03
See application file for complete search history.

(56) References Cited

U.S. PATENT DOCUMENTS

| | | | | |
|---|---|---|---|---|
| 4,077,522 A * | 3/1978 | Trubiano | ....................... | 211/175 |
| 4,909,011 A * | 3/1990 | Freeman et al. | ............. | 52/648.1 |
| 5,038,943 A * | 8/1991 | Reinke | .......... | 211/59.1 |
| 5,240,213 A * | 8/1993 | Horcher | ................... | 248/223.41 |
| 5,379,567 A * | 1/1995 | Vahey | ............................ | 52/850 |
| 5,384,937 A * | 1/1995 | Simon | ............................ | 24/295 |
| 5,417,028 A * | 5/1995 | Meyer | ............................ | 52/846 |
| 5,660,008 A * | 8/1997 | Bevilacqua | .................. | 52/169.5 |
| 5,769,068 A * | 6/1998 | Takahashi | ..................... | 126/569 |
| 5,953,870 A * | 9/1999 | Jette | ............................. | 52/220.1 |
| 5,977,478 A * | 11/1999 | Hibino et al. | ................. | 136/259 |
| 6,020,554 A * | 2/2000 | Kaminar et al. | ............. | 136/246 |
| 6,102,496 A * | 8/2000 | Parham | ...................... | 312/138.1 |
| 6,105,316 A * | 8/2000 | Bottger et al. | ............... | 52/173.3 |
| 6,234,330 B1 * | 5/2001 | Gray | ............................. | 211/106 |
| 6,393,796 B1 * | 5/2002 | Goettl et al. | .................... | 52/846 |
| 6,427,400 B1 * | 8/2002 | Greenblatt | .................... | 52/220.5 |
| 6,672,022 B2 * | 1/2004 | Simmons | ....................... | 52/263 |

(Continued)

FOREIGN PATENT DOCUMENTS

| WO | 00/12839 A1 | 3/2000 |
|---|---|---|
| WO | 2009/040081 A1 | 4/2009 |

OTHER PUBLICATIONS

EPO Machine translation of WO 2009040081 A1.*

(Continued)

*Primary Examiner* — James Ference
(74) *Attorney, Agent, or Firm* — Bryan Cave LLP

(57) ABSTRACT

Support structures and systems for electrical panels, such as solar panels or collectors, and other materials and devices are described. The structures are relatively strong and lightweight and include cable management features.

18 Claims, 6 Drawing Sheets

(56) References Cited

U.S. PATENT DOCUMENTS

| | | | |
|---|---|---|---|
| 6,800,801 B2* | 10/2004 | Sasaoka et al. | 136/246 |
| 7,012,188 B2* | 3/2006 | Erling | 136/251 |
| 7,597,203 B2* | 10/2009 | Jasniy | 211/119 |
| 7,959,019 B2* | 6/2011 | Jette | 211/117 |
| 8,281,524 B2* | 10/2012 | Hund et al. | 52/173.3 |
| 2001/0011441 A1* | 8/2001 | Jette | 52/220.1 |
| 2002/0003194 A1* | 1/2002 | Simmons | 248/49 |
| 2002/0023888 A1* | 2/2002 | Wynne et al. | 211/119 |
| 2002/0026765 A1* | 3/2002 | Vahey | 52/732.1 |
| 2007/0012640 A1* | 1/2007 | Scholen et al. | 211/195 |
| 2007/0246039 A1* | 10/2007 | Brazier et al. | 126/621 |
| 2007/0295392 A1* | 12/2007 | Cinnamon | 136/251 |
| 2008/0017760 A1* | 1/2008 | Larsen et al. | 248/49 |
| 2008/0041011 A1* | 2/2008 | Kannisto | 52/726.2 |
| 2009/0008512 A1* | 1/2009 | Davis et al. | 248/49 |
| 2009/0078299 A1* | 3/2009 | Cinnamon et al. | 136/244 |
| 2009/0107541 A1* | 4/2009 | Linke et al. | 136/246 |
| 2009/0126782 A1* | 5/2009 | Krause et al. | 136/251 |
| 2009/0242014 A1* | 10/2009 | Leary | 136/251 |
| 2009/0260674 A1* | 10/2009 | Linke | 136/246 |
| 2009/0266352 A1* | 10/2009 | Wetmore | 126/571 |
| 2009/0266406 A1* | 10/2009 | Duke et al. | 136/251 |
| 2009/0314334 A1* | 12/2009 | Saha | 136/249 |
| 2009/0320906 A1* | 12/2009 | Botkin et al. | 136/251 |
| 2010/0018571 A1* | 1/2010 | Placer | 136/251 |
| 2010/0089389 A1* | 4/2010 | Seery et al. | 126/608 |
| 2010/0089390 A1* | 4/2010 | Miros et al. | 126/608 |
| 2010/0219304 A1* | 9/2010 | Miros et al. | 248/125.8 |
| 2010/0235206 A1* | 9/2010 | Miller et al. | 705/7 |
| 2011/0197944 A1* | 8/2011 | Hund et al. | 136/244 |
| 2011/0314751 A1* | 12/2011 | Jette | 52/173.3 |

OTHER PUBLICATIONS

International Search Report for PCT/US2011/055643 dated Apr. 27, 2012, 2 pages.

* cited by examiner

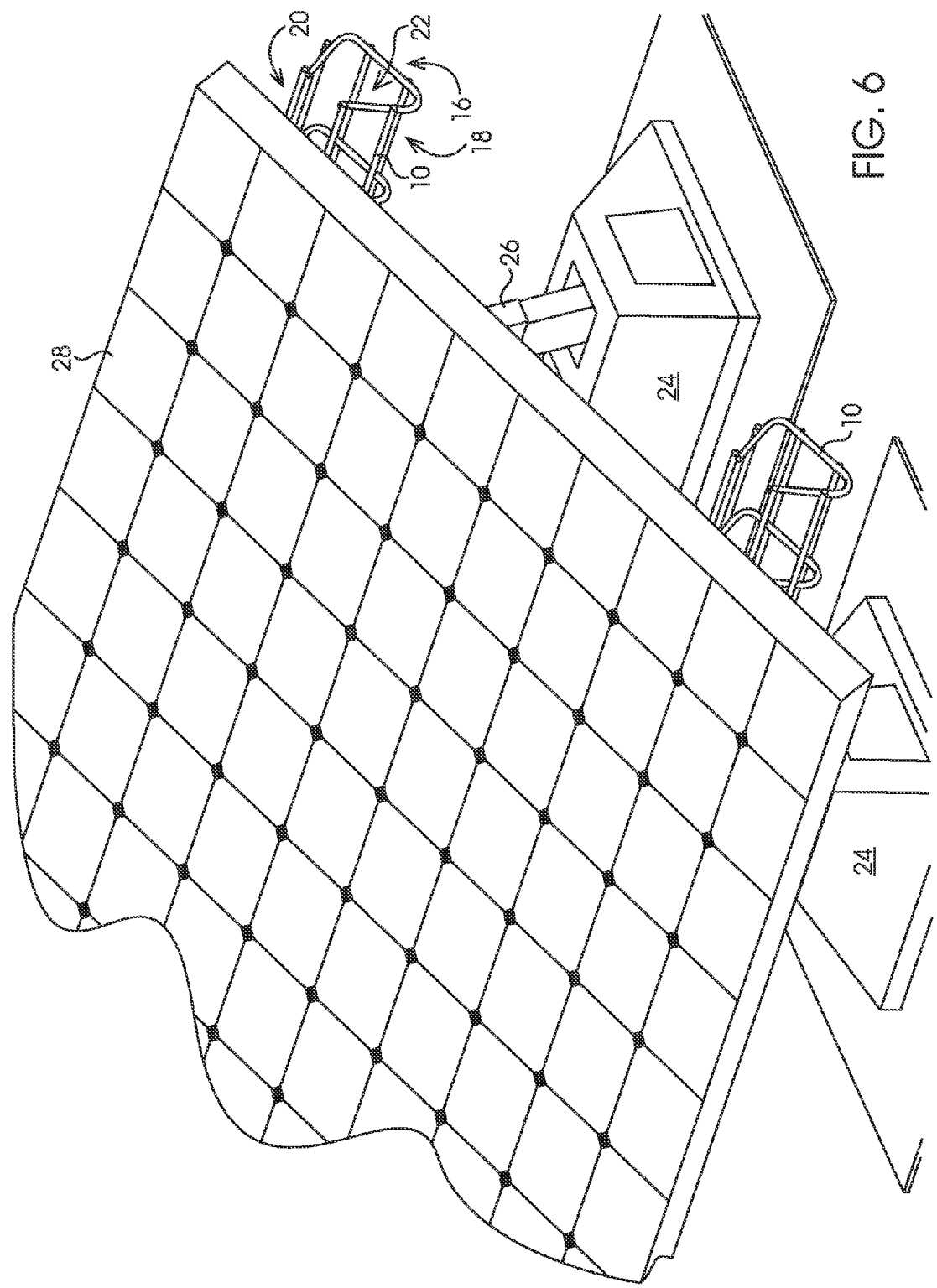

SUPPORT STRUCTURE AND SYSTEMS INCLUDING THE SAME

FIELD OF THE DISCLOSURE

The present disclosure generally relates to support structures and systems for electrical panels, such as solar panels or collectors.

BACKGROUND OF THE DISCLOSURE

Solar arrays can be implemented as part of a terrestrial solar power system for the conversion of sunlight into electrical energy. The technical design and the mode of operation of such arrays or solar panels are known to a sufficient extent. Normally, such arrays are implemented as panel-like elements and are stationary or movably mounted preferably on roofs or at ground level, often on standalone framework-like mounting devices. Because arrays are often mounted outdoors and are large, heavy structures, this presents challenges. Even moderate wind can cause bending and the array may be capable of bending under its own weight. Thus, relatively rigid and secure structures for mounting and/or attaching the solar panels or arrays are generally desirable, but this can often come at the expense of lightweight, easy-to-install components. A need further exists for greater pass-through cable capability and increased cable management.

SUMMARY OF THE DISCLOSURE

Among the various aspects of the present invention is the provision of support structures and systems for electrical panels and other materials, structures, and devices, as well as related methods.

Briefly, therefore, the present invention is directed to a support structure comprising at least one frame structure, the frame structure comprising a plurality of grid elements and having a three-dimensional shape that is substantially that of a truncated triangular prism.

Another aspect of the invention is directed to support systems including one or more of the support structures described herein. Kits and methods are also described herein.

Other objects and features will be in part apparent and in part pointed out hereinafter.

BRIEF DESCRIPTION OF THE DRAWINGS

The details of the present invention, both as to its construction and operation can best be understood with reference to the accompanying drawings, in which like numerals refer to like parts, and in which:

FIG. 6 is a front perspective view of the support system described herein.

Additional advantages and features will become apparent to those skilled in the art from this disclosure, including the following detailed description. While the invention is described herein with reference to implementations thereof, the invention is not limited to those implementations. Those of ordinary skill in the art having access to the teachings herein will recognize additional applications, modifications and implementations, which are within the scope of the invention as disclosed and claimed herein and with respect to which the invention could be of utility.

DETAILED DESCRIPTION

The accompanying Figures and this description depict and describe embodiments of a support structure and related support systems in accordance with the present disclosure, and features and components thereof. It should also be noted that any references herein to front and back, right and left, top and bottom and upper and lower are intended for convenience of description, not to limit the present disclosure or its components to any one positional or spatial orientation.

Figure 1:
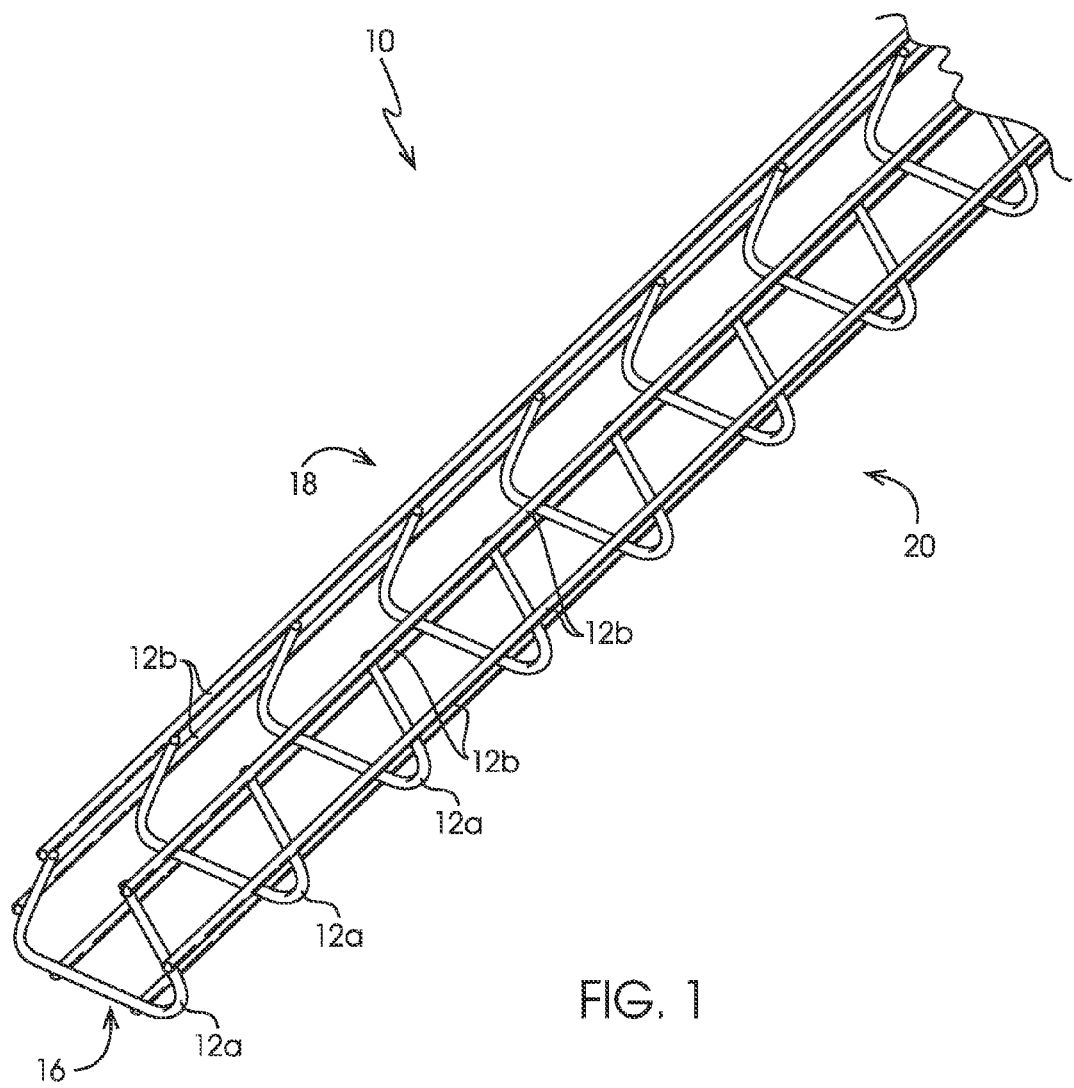
FIG. 1 is a back perspective view of the support structure described herein.
Figure 2:
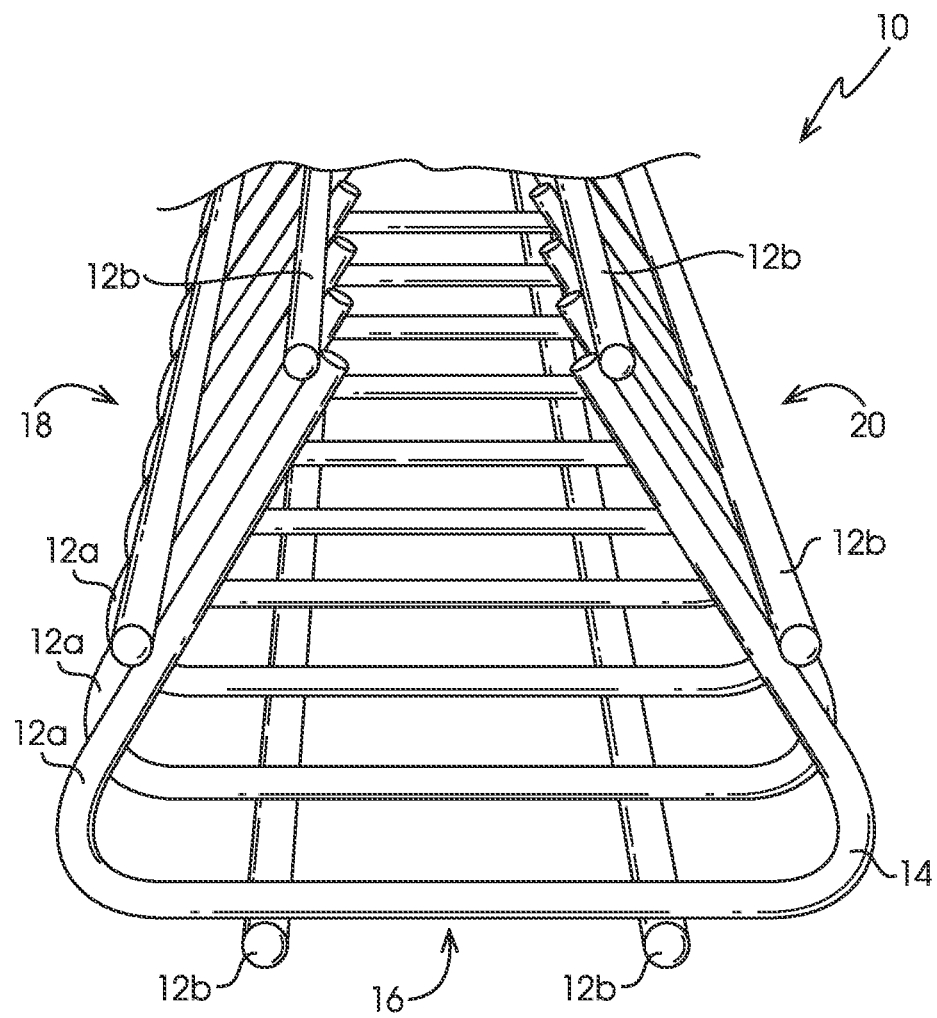
FIG. 2 is a side perspective view of the support structure described herein.

The present disclosure relates to support structures for solar panels, generally identified as structure 10 in the related figures. FIG. 1 generally depicts a support structure for electrical panels (e.g., solar panels or arrays) and accompanying cabling in accordance with the present disclosure.

As shown, the solar panel support structure 10 includes a framework produced from individual grid elements 12, which generally extend at right angles to one another (i.e., a series of parallel- and perpendicular-running grid elements 12A and 12B, respectively) to form the frame structure 14. The first and second pieces 12A and 12B are arranged in a grid network that defines the structure as exemplified in the various figures. The resulting frame structure 14 is angled twice so as to define the desired shape. In further detail, the support structure 10 comprises a panel- or tray-like bottom region or wall 16, a front wall 18, and a rear wall 20. The front wall 18 and the rear wall 20 are angled from the opposed horizontal edges of the bottom region. Although the first and second grid elements or pieces 12A and 12B are shown in the figures as rod-like structures having a substantially circular cross-section, it will be understood that these pieces can have a variety of lengths, widths, and cross-sectional shapes, including round (circular), oval, triangular, square, rectangular, hexagonal, or flat (e.g., strip-shaped). Combinations of different cross-sectionally shaped grid elements can also be used to form the structure.

In general, the frame structure 14 has a three-dimensional shape that is substantially pentahedral. Preferably, both the front wall 18 and the rear wall 20 are angled at an angle of less than 90° with respect to the bottom region 16. Thus, the three-dimensional shape is substantially that of a triangular prism. In one embodiment, the triangular prism is substantially in the form of an isosceles triangular prism. In this embodiment, for example, the length of at least two of the bottom wall 16, front wall 18, and rear wall 20 are equal; typically, the front wall 18 and the rear wall 20 will be of equal length. In another embodiment, the triangular prism is substantially in the form of an equilateral triangular prism. In this embodiment, for example, the length of the bottom wall 16, front wall 18, and rear wall 20 are equal. In another embodiment, the triangular prism is substantially in the form of a scalene triangular prism. In this embodiment, for example, the length of the bottom wall 16, front wall 18, and rear wall 20 are all unequal. As shown in the various figures, the edges or apices of the triangular prism may be substantially rounded, or, in the alternative, one or more of the edges or apices of the triangular prism may not be rounded.

Figure 3:
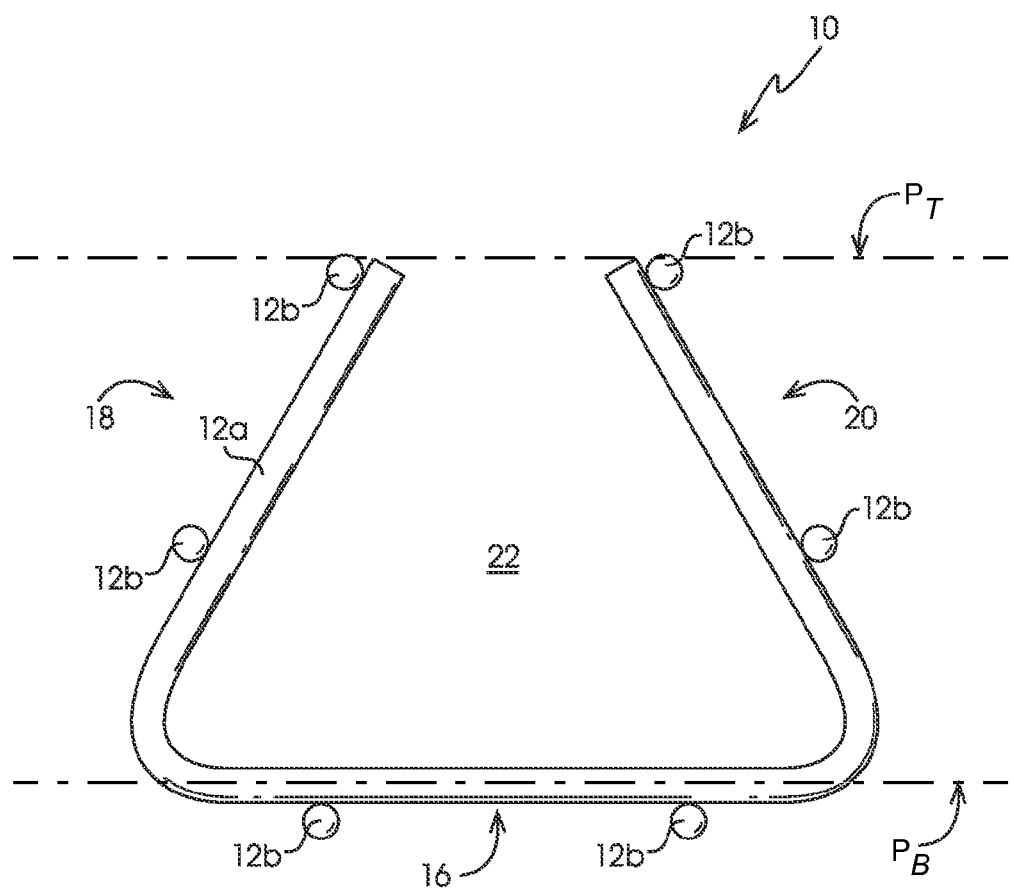
FIG. 3 is a side elevational view of the support structure described herein.

In further detail and as shown in the various figures, the three-dimensional shape of the frame structure 14 is substantially that of a truncated triangular prism; that is, one apex of the triangular prism is replaced by a plane section. In one preferred embodiment, the plane section of the truncation is substantially parallel to the plane of the bottom region or wall 16. This is generally depicted in FIG. 3, with dashed lines $P_T$ and $P_B$. Alternatively, the plane section of the truncation can be at an angle relative to the plane of the bottom region or wall 16. Thus, for example, the length of the front wall 18 may be longer than the length of the rear wall 20, or vice versa.

The support structure is advantageously adapted to hold a plurality cables and/or wires, i.e., in the form of a suspension tray. The plane of truncation of the three-dimensional triangular prism shape of the frame structure provides an opening or access to a center cavity or hollow space 22 within the frame structure. With this extended access point, various articles (e.g., cables and wires) can be laid into the frame structure and placed on the inner tray-like surface of the bottom wall 16 at virtually any point across the length of the structure. The cables and/or wires may be connected to the solar panels or arrays attached to the support structure, and/or may be connected to other systems, such as electrical or power systems, HVAC systems, computer systems, combinations thereof, and the like. In various embodiments, the frame structure may further include one or more protective features or conductive elements that serve to electrically bond and ground the tray, such as described in U.S. Patent Application Publication No. 2010/0320334.

The tray-like surface of the bottom wall 16 described herein may be used for supporting, suspending and retaining a variety of different articles, such as telecommunication cables, power cables, conduit, ductwork, and other items. Advantageously, the open matrix of the support structures described herein is capable of keeping such cables organized, yet allows cables to enter and exit at virtually any point along the length of the support structure. Moreover, the triangular shape provides a three-sided structure that is lighter than standard channel framing, yet is strong enough to support a range of devices and equipment in extreme weather or wind conditions and static load applications. With the open structure, wind drag on the entire installation is also beneficially reduced.

As noted above, the grid elements generally form a wire mesh support upon which cables and/or wires (and/or other items described in further detail below) may be placed (i.e., upon the inner surface of the bottom region or wall 16 within the hollow space 22) and also upon which solar panels or arrays (and/or other items described in further detail below) may be attached (i.e., upon the outer surface of the front and/or rear walls 18 and 20). According to one preferred embodiment, the grid elements 12 are generally disposed at right angles to one another and may be joined or secured at the points of intersection, for example, by welding, glue, attachment hardware (such as brackets, clamps, screws, nuts and bolts, etc.), and other attachment techniques. The methods and/or devices for joining and securing the grid elements 12 to one another are not narrowly critical, provided that a sufficient stabilization of the grid elements and frame structure is achieved, such that the structure can withstand or substantially resist movement, torquing, or breakage during shipping, installation, and/or in use (e.g., during severe weather and/or high winds, earthquakes, etc.).

Although two grid elements 12B (i.e., those running perpendicular to grid elements 12A) are shown on each of the on each of the bottom wall 16, front wall 18, and rear wall 20, it will be understood that more than two of these grid elements may be provided on one or more of these walls (e.g., 3, 4, 5, or more of grid elements 12B on one or more of the bottom wall 16, front wall 18, and rear wall 20). Similarly, any number of truncated triangle-shaped grid elements 12A may be included within the framework, depending upon the desired length of the structure (e.g., based upon the size and/or number of electrical panels (such as solar panels) to be mounted).

The structure can be formed such that the distances between each individual grid element is substantially identical. Thus, for example, the distance between each parallel-spaced truncated triangle-shaped grid element 12A can be substantially identical. By way of another example, the distance between the two (or more) grid elements 12B are substantially identical. Alternatively, the distance(s) between some or all of the individual grid elements 12A and/or 12B can be different. For example, grid elements 12B can be spaced more closely in the areas nearer to the lateral edges, e.g., to provide additional stabilization in this areas, if necessary.

Other aspects of the present disclosure are directed to support systems including the support structures described herein in combination with other positioning and/or mounting components. Such additional components may include, for example, weighting elements (such as roof blocks), stationary or adjustable stands or towers for holding the support structures, and various connection hardware such as clamps, brackets, screws, nuts and bolts, washers, and the like. Weighting elements, for example, can be formed of a variety of materials including wood, concrete, and rubber, and can generally be used to stabilize and/or maintain in place the support structures and/or cushion the roof or ground from the support system. Depending upon the desired placement, stands or towers for attaching the support structure(s) can be anchored in the ground or other substrate, connected to the weighting elements (e.g., roof blocks), to walls and/or roofs of buildings, to other structures (such as water towers, electrical or communications towers, signs or utility poles), or to vehicles including cars, trains, buses, boats, and the like, etc.). The stands or towers are desirably adjustable to allow for multiple height and/or angle adjustments. The support structures themselves can also be anchored in the ground or other substrate or mounted directly (i.e., without a stand or tower) to the weighting elements (e.g., roof blocks), to walls and/or roofs of buildings, to other structures (such as water towers, electrical or communications towers, signs or utility poles), or to vehicles including cars, trains, buses, boats, and the like, etc.).

Figure 4:
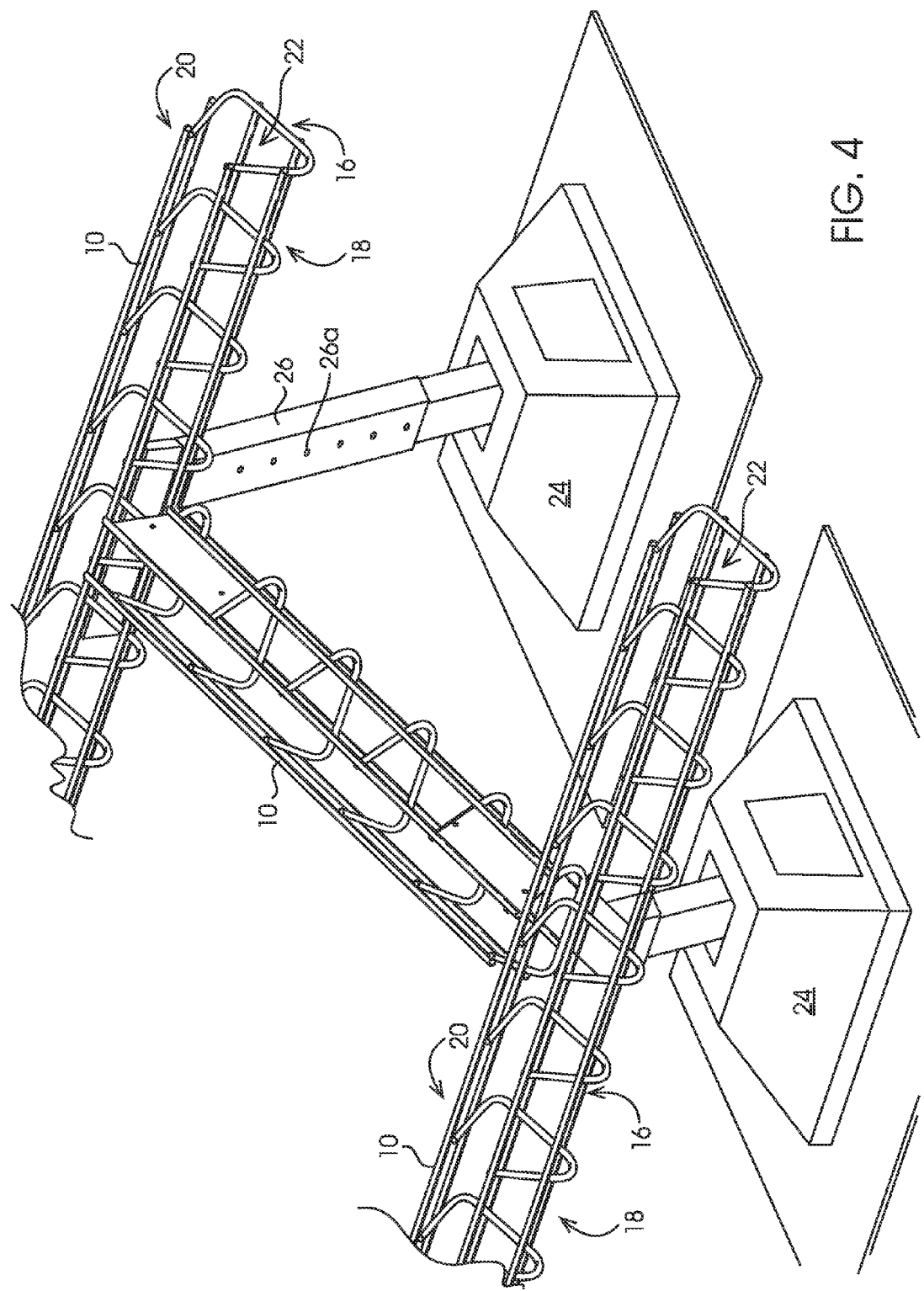
FIG. 4 is a front perspective view of the support system described herein.
Figure 5:
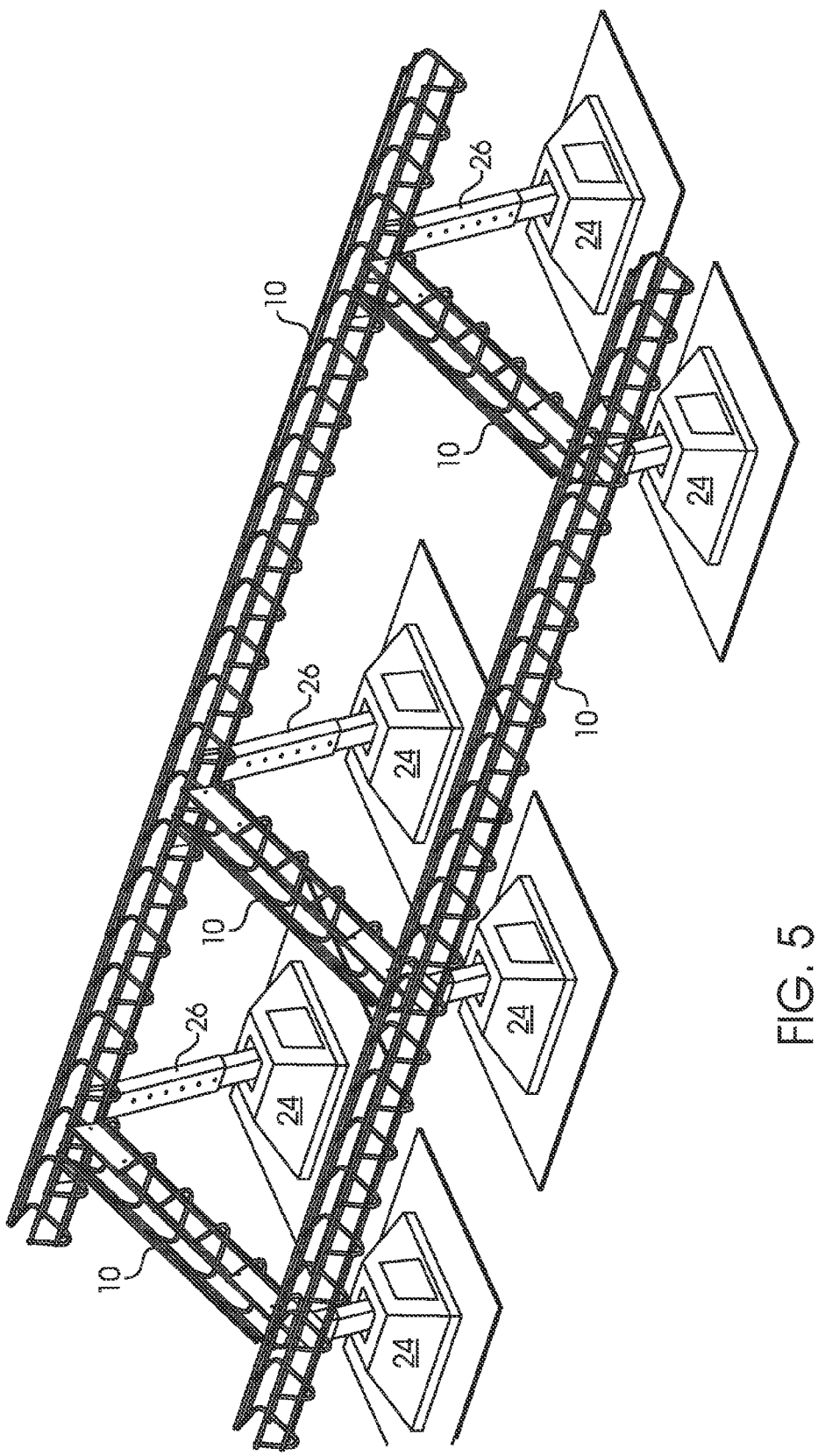
FIG. 5 is a front perspective view of the support system described herein.

FIGS. 4 and 5 depict an exemplary support system including multiple support structures 10, roof blocks 24, adjustable stands 26 (including pre-drilled adjustable mounting holes 26A). FIG. 6 shows a solar panel 28 attached to the support system. It will be understood that the placement or positioning of the individual support structures 10 in FIGS. 4-6 are not limited to the pattern shown, but may be positioned in a variety of ways depending on the number of panels and/or the location of the system, among other factors.

According to additional aspects of the present disclosure, kits are provided that may be used to construct the support systems and/or carry out the methods described herein. For example, a kit may comprise one or more support structures, as described herein, which include a series of grid elements that collectively form a frame structure that is substantially pentahedral. In a preferred embodiment, the three-dimensional shape is a truncated triangular prism.

The kits may further include positioning and/or mounting components, such as described above. This may include, for example, weighting elements (such as roof blocks), stationary or adjustable stands or towers for positioning and/or angling the support structure(s), and connection hardware (e.g., clamps, brackets, screws, nuts and bolts, washers, and the like). In various embodiments, the kits may include one or more electrical panels (e.g., solar panels or arrays) for attachment to the support structure. The kits will typically include a set of instructions for installing the support structures and related support systems described herein. The instructions may be a separate sheet(s) or brochure, but may additionally or alternatively be on or in another medium such as a CD, DVD, software program, booklet, or printed on or affixed to one or more of the kit components (e.g., the support structure, weighting element, stand or tower, etc.).

In general, the structures described herein are capable of supporting or holding a range of materials, equipment, and devices. This may include other structures, electrical or mechanical devices and materials, or building or construction devices and materials. In one particular embodiment, the frame structure is capable of supporting an electrical device. Representative electrical devices include, but are not limited to decorative devices, lighting devices, heating devices, cooling devices, sensing devices, control devices, communication devices, life safety and health maintenance devices, audio-visual devices and combinations thereof. In another embodiment, the frame structure is capable of supporting one or more of an electrical box, a light, and a communication device. In another embodiment, the frame structure is capable of supporting plumbing materials, such as including water lines, drain lines, sewer lines, etc. In another embodiment, the frame structure is capable of supporting heating and cooling materials, including gas lines, ductwork, etc. In yet another embodiment, the frame structure is capable of providing a general structural support or secondary framing of an existing structure (such as roofs, walls, ceilings, floors, scaffolding, platforms, stages, and the like).

In a particularly preferred embodiment, the frame structure is capable of supporting an electrical panel and one or more cables; more preferably in this embodiment, the electrical panel is a solar panel. It will be understood that the support structures described herein are not limited to carrying a particular type of solar panel, module, or array (also commonly referred to as photovoltaic module or photovoltaic panel, as solar power is produced by the conversion of sunlight into electricity using arrays of photovoltaic (PV) cells as discussed above). The support structures described herein may be used for mounting frameless or framed solar modules or panels on slant-roof, flat-roof, or ground-mounted support systems.

Features of a solar cell system include the specification of the number of cells used to make up an array, and the shape, aspect ratio, and configuration of the array.

One aspect of a solar cell system is the physical structure of the semiconductor material layers constituting the solar cell. Solar cells are often fabricated in vertical, multijunction structures to utilize materials with different bandgaps and convert as much of the solar spectrum as possible. One exemplary multijunction structure is the triple junction solar cell structure consisting of a germanium bottom cell, a gallium arsenide (GaAs) middle cell, and an indium gallium phosphide (InGaP) top cell.

In the design of conventional solar cells, such as silicon and III-V compound semiconductor solar cells, one electrical contact is typically placed on a light absorbing or front side of the solar cell and a second contact is placed on the back side of the cell. A photoactive semiconductor is disposed on a light-absorbing side of the substrate and includes one or more p-n junctions, which creates electron flow as light is absorbed within the cell. Grid lines extend over the top surface of the cell to capture this electron flow which then connect into the front contact or bonding pad.

The individual solar cells are typically disposed in horizontal arrays, with the individual solar cells connected together in electrical series. The shape and structure of an array, as well as the number of cells it contains, and the sequence of electrical connections between cells are determined in part by the desired output voltage and current of the system. Another aspect of terrestrial solar power systems is the use of light beam concentrators (such as lenses and mirrors) to focus the incoming sunrays onto the surface of a solar cell or solar cell array.

The support structure described herein may be constructed of any suitable material. For example, the trays may be constructed of stainless steel, aluminum, other metals or alloys, or combinations of the foregoing. In addition, the present disclosure provides that the components described herein (including the support structure components and the support system components) may be secured to each other using brackets, clamps, screws, nuts and bolts, nails, adhesives, or other fastening devices or methods or, in certain cases, the use of gravity force.

Having described the invention in detail, it will be apparent that modifications and variations are possible without departing the scope of the invention defined in the appended claims. Although certain exemplary methods, apparatus, and/or articles of manufacture have been described herein, the scope of coverage of this disclosure is not limited thereto. On the contrary, this disclosure covers all methods, apparatus, and/or articles of manufacture fairly falling within the scope of the appended claims either literally or under the doctrine of equivalents.

What is claimed is:

1. A support structure comprising at least one frame structure,
    the frame structure comprised of a plurality of grid elements and having a first region defining a front wall of the frame structure, a second region defining a bottom wall of the frame structure, and a third region defining a rear wall of the frame structure;
    wherein the first region and the third region are each angled at an angle of less than 90 degrees relative to the second region, such that the first, second, and third regions form a triangular shape; and
    wherein the first region and the third region terminate at end portions distal to the second region at an imaginary plane of truncation parallel to the second region, such that the frame structure has a three-dimensional shape that is a truncated triangular prism; and wherein access to a hollow region of the truncated triangular prism can be obtained along the imaginary plane of truncation.

2. The support structure of claim 1, wherein the plurality of grid elements are arranged in a grid network that defines the truncated triangular prism.

3. The support structure of claim 1, wherein a plurality of spaces in the grid network allow access to a hollow region of the truncated triangular prism.

4. The support structure of claim 1, wherein the grid elements comprise a plurality of first pieces spaced parallel to each other and one or more second pieces connecting the plurality of first pieces to define the three-dimensional shape.

5. The support structure of claim 4, wherein the second pieces are oriented perpendicularly to the first pieces.

6. The support structure of claim 1, wherein the truncated triangular prism is in the form of (i) a truncated isosceles triangular prism or (ii) a truncated equilateral triangular prism.

7. The support structure of claim 1, wherein at least one apex of the truncated triangular prism is rounded.

8. The support structure of claim 1, wherein the frame structure is capable of supporting an electrical device.

9. The support structure of claim 8 wherein the electrical device is selected from the group consisting of decorative devices, lighting devices, heating devices, cooling devices, sensing devices, control devices, communication devices, life safety and health maintenance devices, audio-visual devices and combinations thereof.

10. The support structure of claim 9 wherein the frame structure is capable of supporting one or more of an electrical box, a light, and a communication device.

11. The support structure of claim 9 wherein the frame structure is capable of supporting an electrical panel and one or more cables.

12. The support structure of claim 11, wherein the electrical panel is a solar panel.

13. The support structure of claim 1, wherein the frame structure is capable of supporting a structure selected from a wall, a ceiling, a floor, a roof, or a platform.

14. The support structure of claim 1, wherein the frame structure is capable of supporting one or more of electrical materials, plumbing materials, or heating and cooling materials, wherein the electrical materials, plumbing materials, and/or heating and cooling materials are selected from one or more of cables, wires, conduit, water lines, sewer lines, drain lines, gas lines, and ductwork.

15. A support system comprising the support structure of claim 1, and a mounting or positioning component selected from the group consisting of a weighting element, a stand or tower, connection hardware, and combinations thereof.

16. A kit comprising the support structure of claim 1 and instructions for installation.

17. The kit of claim 13 wherein the kit further comprises a mounting or positioning component selected from the group consisting of a weighting element, a stand or tower, connection hardware, and combinations thereof.

18. A method of mounting a solar panel, the method comprising attaching said solar panel to the support structure of claim 1.

* * * * *